United States Patent [19]

Kume et al.

[11] Patent Number: 4,873,429

[45] Date of Patent: Oct. 10, 1989

[54] OPTICAL PICK-UP HEAD WITHOUT PICK-UP OF STRAY LIGHT

[75] Inventors: Hidehiro Kume; Yoshiyuki Matsumoto; You Yoshitoshi, all of Tokyo, Japan

[73] Assignee: Sony Corporation, Tokyo, Japan

[21] Appl. No.: 152,007

[22] Filed: Feb. 3, 1988

[30] Foreign Application Priority Data

Feb. 6, 1987 [JP] Japan .................................. 62-25936

[51] Int. Cl.⁴ ............................................. H01J 3/14
[52] U.S. Cl. ................................ 250/216; 250/211 J; 357/19
[58] Field of Search ............... 250/211 J, 211 R, 216; 357/19, 30 L, 30 M; 369/43-46

[56] References Cited

U.S. PATENT DOCUMENTS 4,733,067  3/1988  Oinoue et al. .................... 250/216
4,772,784  9/1988  Yoshitoshi et al. ............. 250/211 J Primary Examiner—David C. Nelms
Assistant Examiner—Stephone B. Alkn
Attorney, Agent, or Firm—Hill, Van Santen, Steadman & Simpson

[57] ABSTRACT

An optical pickup head comprising a substrate on which a optical sensor is formed, and an optical member adhered on said optical sensor on said substrate by an adhesive and including a semitransmissive reflective film adapted to reflect the light emitting from a laser source and to transmit the light returned from a second medium of a disk, characterized in that the refractive index of said optical member is set so as to be larger than the refractive index of said adhesive.

5 Claims, 2 Drawing Sheets

OPTICAL PICK-UP HEAD WITHOUT PICK-UP OF STRAY LIGHT

BACKGROUND OF THE INVENTION

1. Field of the Invention

This invention relates to an optical pickup head for reading out signals from an optical disk for example.

2. Description of the Prior Art

There are various optical heads for optically reading information signals recorded to an optical disk such as a so-called digital audio disk. To meet the recent demand of miniaturizing a device and reducing the cost, the applicant has disclosed an optical head wherein a semiconductor laser device is used as a light source and a beam splitter prism and the semiconductor laser are provided on a semiconductor substrate with light receiving devices being formed on its surface in our PCT application Publication No. WO 87/05142.

The preceding optical head, the structure of which is illustrated in FIG. 1, consists of a semiconductor substrate 31 with light receiving devices 32 being formed on the surface thereof, a beam splitter prism 33 having almost trapezoidal sections fixedly mounted on the light receiving devices 32, and a semiconductor laser 36 provided on the semiconductor substrate 31 in front of a semitransmissive reflective film 34 provided on the inclined end surface of the beam splitter prism 33. In this optical head, a laser light irradiated from the semiconductor laser 36 is almost divided into two, namely a reflected light and a transmitted light at the semitransmissive reflective film 34, whereby the reflected light is ultimately collected by an objective lens 39 to be projected on a record surface of a disk 40 such as compact disk, while the transmitted light is refracted at a boundary surface of the prism 33 to be entered into the light receiving device 32. The reflected light is useful being used to read out information signals from the disk 40, whereas the transmitted light introduced directly from the semiconductor laser 36 to the prism 33 is a so-called stray light, having no necessity for optical signal detection.

The laser beam radiated on the disk 40 and reflected on the record surface thereof is entered transmitting the film 34 of the prism 33 through the objective lens 39 to form a so-called return light, which is detected by the light receiving devices 32. However, in contrast to the return light, since the above-mentioned unnecessary light being entered directly has the intensity or amount of light several times larger than that of the return light, it causes a DC (direct current) offset in the detected signals from the light receiving devices 32. This exerts a harmful influence on error detection signals in the light spots concentrated on the disk 40. Outputs due to the unnecessary light can be eliminated by adding a so-called DC offset eliminating circuit in a detection circuit as shown in FIG. 2. With reference to FIG. 2, the detected outputs offsetting said DC offset can be obtained from the output terminal 45 by supplying light detected outputs from a photodiode 42 corresponding to the light receiving devices 32 to an inverting input terminal of an operational amplifier 43 and by supplying outputs from a direct current voltage generating circuit 44 generating the direct current voltage $V_{DC}$ in accordance with said DC offset to a non-inverting input terminal of the operational amplifier 43. However, such DC offset eliminating circuit is required for every detecting device in the light sensor, so that the cost runs up due to an increase of numbers of circuit parts and of adjustment steps.

Besides, when the DC offset is caused in the optical detecting outputs as earlier noted, the optical output of the semiconductor laser and the sensitivity of the detector are fluctuated by temperature for example, and are to be sensed of the error detection signals as an error component, resulting in a mistaken control.

In order to avoid the foregoing problem or defect, the applicant has provided a semiconductor laser in our preceding U.S. patent application Ser. No. 41,140 now U.S. Pat. No. 4,772,784. In this application, there is disclosed a semiconductor laser device including a coating layer having more than two layers the refractive index of which is set such that the directly entered transmitted light or the stray light from the semiconductor laser with a greater incident angle than the prescribed one is almost totally reflected on the boundary surface of the semiconductor substrate and the beam splitter prism.

According to the technology of the invention, the optical detecting section is effectively irradiated only by the return light from the medium, and tracking or focusing control of the optical head and so on improves. Yet in this technology, it is difficult to control the film thickness of the coating layer. Since a manufacturing error of the film thickness becomes an error of the angle of separation of said stray light and detecting light, and the amount of light adjacent to the angle of separation changes slowly, it becomes further difficult to set the accurate angle of separation. Also, the additional coating film increases the cost.

OBJECT AND SUMMARY OF THE INVENTION

In order to solve the above problems in the prior art, it is an object of the present invention to provide an optical pickup head that can effectively prevent the direct incident light on the stray light from entering into the light sensor without using a coating film.

It is another object of the present invention to provide an optical head of a simple structure requiring no adjustment and that can be supplied with reasonable cost.

In accordance with the optical head of the present invention, it comprises a substrate on which a light sensor is formed, a laser source, and an optical member adhered by an adhesive on the light sensor on the substrate including a semitransmissive reflective film adapted to reflect the light emitting from the laser source and to transmit the light returned from the medium, with the refractive index n1 of the optical member being larger than the refractive index n2 of the adhesive (n1>n2).

With such structure of the present invention, corresponding to the refractive indices n1 and n2 of the optical member and the adhesive, the critical angle $\alpha$ is determined so that the light from the optical member to the adhesive layer is totally reflected. By enlarging the incident angle of the unnecessary light on the stray light that is directly guided from the laser light source to the optical member through the semitransmissive reflactive film to be forwarded to the light sensor through the adhesive layer more than the critical angle $\alpha$, the unnecessary light can be totally reflected at the boundary surface of the optical member and the adhesive. In this connection, the critical angle $\alpha$ is indicated as $\alpha = \sin^{-1}(n2/n1)$.

Stated differently, the unnecessary light directly entered from the laser light is separated from the return light from the medium in the optical head of the present invention applying only the critical angle due to the difference of the refractive indices and using the adhesive layer for adhering the optical member such as a beam splitter prism on to the semiconductor substrate with a light sensor. Thus, it is possible to provide inexpensive optical pickup heads of simple structure that get no influences from the film thickness for example, without providing an optical thin film for separation nor an electrical means such as a DC offset eliminating circuit. Moreover, precise and stable effects can be obtained since there are few fluctuations and changes in the detected signals caused by the error at the time of manufacturing or by the temperature changes compared with the case using an optical thin film for separation or a DC offset eliminating circuit, etc.

Further aspects of the invention are defined in the claims.

BRIEF DESCRIPTION OF THE DRAWINGS

The invention will now be further described, by way of illustrative and non-limiting example, with reference to the accompanying drawings, in which.

DESCRIPTION OF THE PREFERRED EMBODIMENT

Figure 1:
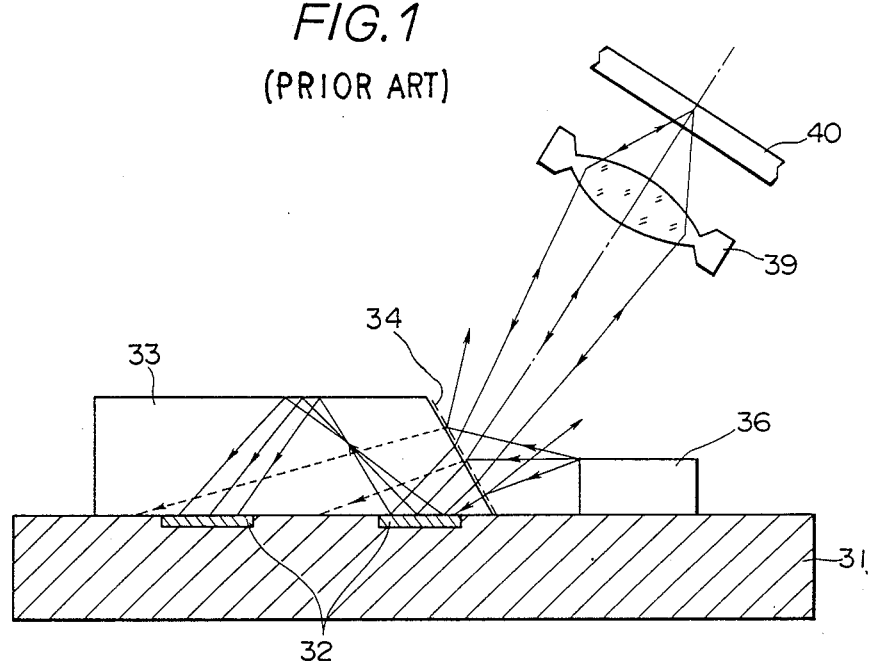
FIG. 1 is a schematic sectional view of an optical head of the prior art.
Figure 2:
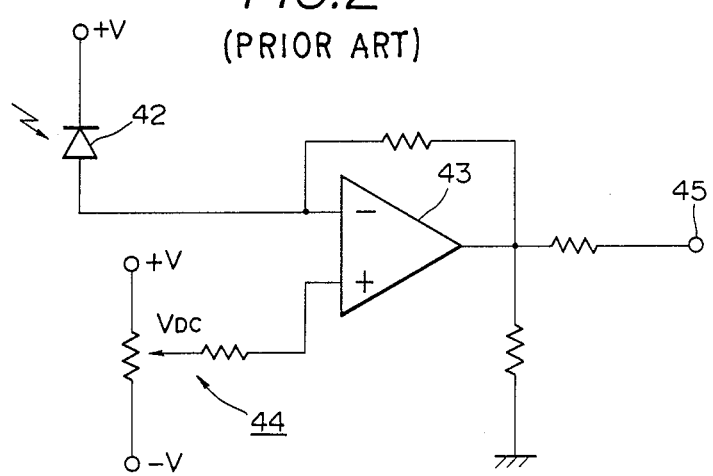
FIG. 2 is a block circuit view showing an example of a DC offset eliminating circuit.
Figure 3:
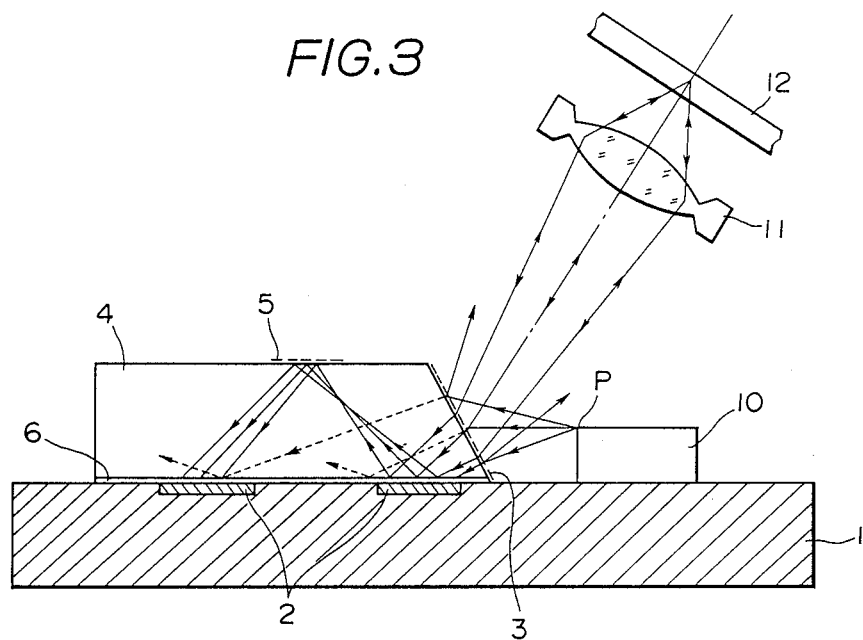
FIG. 3 is a schematic sectional view of an example embodying the present invention of an optical pickup head.

An embodiment of the present invention is explained in a schematic sectional view of FIG. 3. In an optical pickup head of FIG. 3, there are formed for example two pairs of light receiving devices 2 for reading out recorded information signals by detecting a reflection light or a return light from an optical record medium such as a digital audio disk, for example, a compact disk, on the surface of a semiconductor substrate 1 of for example Si. These light receiving devices 2 form a light sensor, whereby tracking error, focusing error and detection of RF signals are performed. On the area of thee light receiving devices 2 being formed on the semiconductor substrate 1, a beam splitter prism 4 as an optical member having a semitransmissive reflective film 3 and almost trapezoidal sections is fixedly adhered through an adhesive layer 6. The semitransmissive reflective film 3 of the beam splitter prism 4 is provided covering a surface which corresponds to an oblique side of said trapezoidal sections. The refractive index n1 of the prism 4 is larger than the refractive index n2 of the adhesive layer 6 (n1>N2). A reflective film 5 is provided to cover the prescribed position of an upper surface of the prism 4.

Also, a semiconductor laser 10 such as a so-called laser diode is provided on the supporting substrate 1. A laser beam outgoing from an emission point P of the semiconductor laser 10 is reflected at the semitransmissive reflective film 3 being provided at the prescribed angle to the substrate 1, and collected on a record surface of a disk 12 through an objective lens 11. The laser light being reflected on the record surface of the disk 12 is introduced to the prism 4 through the objective lens 11 and the semitransmissive reflective film 3 of the optical head, whereby it is entered into one of the light receiving devices 2 to be reflected thereon, and then it is reflected at the reflective film 5 to be entered into the other light receiving device 2. Also, the laser beam radiated from the emission point P of the semiconductor laser 10 is directly introduced to the prism 4 through the semitransmissive reflective film 3 of the substrate 1 as indicated by a dotted line in FIG. 3. The direct incident light is a so-called stray light of no necessity for optical detection as earlier noted.

In the present invention, the refractive index n1 of the prism 4 as an optical member is previously set so as to be larger than the refractive index n2 of the adhesive layer 6 (n1>n2). Therefore, as compared with a critical angle $\alpha$ calculated on the basis of these refractive indices n1, n2, that is, the minimum incident angle $\alpha$ ($=\sin^{-1}(n2/n1)$) required for the light from the prism 4 to the adhesive layer 6 to be totally reflected, any light with an incident angle more than that will be totally reflected. Accordingly, among the lights radiated from the emission point P of the semiconductor laser 10, the incident angle to the adhesive layer 6 of the light being directly guided into the prism 4 as indicated by the dotted line of FIG. 3, directly forwarding the light receiving devices 2, is set to be larger than said critical angle $\alpha$ in order to prevent the stray light from reaching the light receiving devices 2.

In the present embodiment, the refractive index n2 of the adhesive layer 6 is set to 1.50 considering that the refractive index of a usual epoxy adhesive is about 1.5, and as for the prism 4 as the optical member, optical glass material having the refractive index n1 of for example 1.77 is used. The critical angle $\alpha$ of the light from the prism 4 to the adhesive layer 6 is approximately 57.9°, almost 58°. Also, the angle of the semitransmissive reflective film 3 of the beam splitter prism 4 to the substrate 1 is set for example to 45°. Under these conditions, examples of the incident angle when the light from the emission point P of the semiconductor laser 10 is directly guided into the prism 4 and is projected forwarding the adhesive layer 6, and the one when the reflected light from the record surface of the disk 12 is directly entered into the prism 4 to reach the adhesive layer 6 will be described with reference to FIG. 4.

Figure 4:
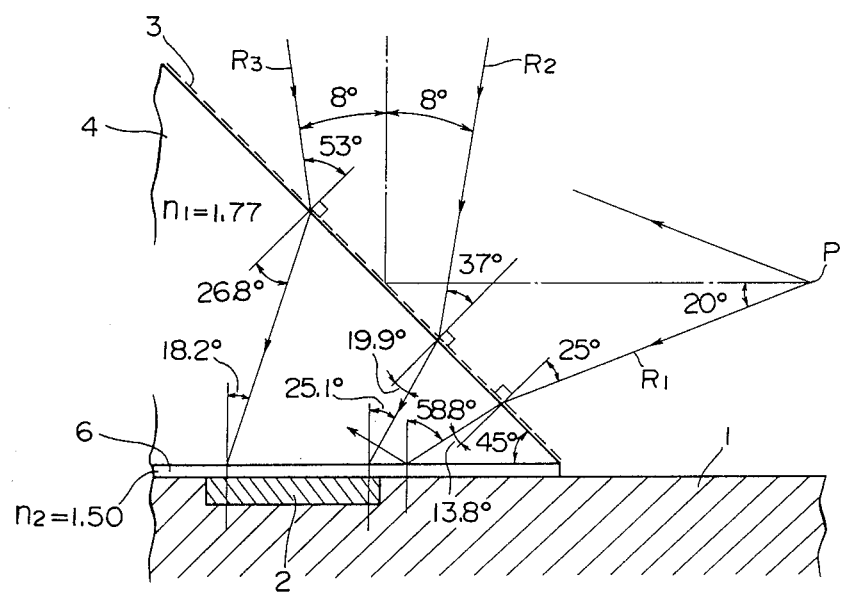
FIG. 4 is a view explaining incident angles of various lights in the embodiment of FIG. 3.

In FIG. 4, when the laser beam radiated from the laser emission point P to be entered into the prism 4 directly forwarding the light receiving device 2 exists in the angular extent of about 20° respectively upper and lower from an optical axis being parallel to the substrate, the minimum incident angle to the adhesive layer 6 within the prism 4 is seen in the light $R_1$ outgoing underneath the optical axis of FIG. 4 at the angle of 20°. The light $R_1$ is entered to the semitransmissive reflective film 3 with the incident angle of 25° forming an outgoing angle of about 13.8° being refracted at the field surface of the prism 4, so the incident angle from the prism 4 to the adhesive layer 6 becomes about 58.8°. As stated above, since the incident angle of the light $R_1$ being guided into the prism 4 to the adhesive layer 6 is larger than the critical angle $\alpha$ (about 57.9°), the light $R_1$ is totally reflected. Thus, all the light rays existing in the angular extent of +20° from the emission point P with the optical axis as the center are totally reflected at the field surface of the prism 4 and the adhesive layer 6.

On the contrary, in case of the so-called return light that is returned being reflected by the medium such as the disk 12 of FIG. 3, provided that the light forwarding the light sensor exists in the angular extent of +8° from the optical axis, the incident angle to the semitransmissive reflective film 3 is supposed to be present in a space between the light $R_2$ of 37° and the light $R_3$ of 53° in FIG. 4. The light $R_2$ in FIG. 4 with the incident angle of 37° is refracted on the boundary surface of the prism 4 so that the outgoing angle from the boundary surface is about 19.9°, so that the incident angle from the prism 4 to the adhesive layer 6 is about 25.1°. The light $R_3$ with the incident angle of 53° is refracted on the boundary surface of the prism 4 so that the outgoing angle is about 26.8° and the incident angle is about 18.2°. Thus the above-mentioned return light in the angular extent of +8° relative to the optical axis is at an angle from about 18.2° to about 25.1° when it is introduced into the prism 4 and falls on the adhesive layer 6, which angle is lesser than the above-mentioned critical angle $\alpha$ (about 57.9°) so that light is introduced into the adhesive layer 6 to reach the light receiving device 2.

From the foregoing it is seen that the unnecessary or stray light proceeding from the semiconductor layer 10 directly towards the light receiving element 2 has the incident light on the adhesive layer 6 larger than the critical angle $\alpha$ so that it undergoes total reflection on the boundary surface between the prism 4 and the adhesive layer 6 so that it does not reach the light receiving device 2 and only the return light from the medium such as the disk falls on the light receiving device 2. The operation of separating the unnecessary light from the return light is not affected by the presence of plural optical thin films having other refractive indices on the surface of the prism 4 or the light receiving device 2 contacting the adhesive layer 6, for example, while it is also not affected by the film thickness and depends only on the refractive index n1 of the prism 4 as the optical member on the refractive index n2 of the adhesive layer 6, so that accurate and stable separation is achieved.

The present invention is not limited to the above embodiment but any laser source other than the semiconductor laser may be employed, while the laser light source may be provided separately from the semiconductor substrate 1. In addition, acrylic adhesives, epoxy or acrylic adhesives having an optical hardenability other than the epoxy adhesives may be employed.

What is claimed is:

1. An optical pick-up head which reads information recorded on a record medium by irradiating said record medium with light generated from a laser source and receiving return light therefrom by a light sensor, comprising, in combination:
   a substrate on which the optical sensor is formed;
   an optical member adhered by adhesive on said optical sensor on said substrate, said adhesive having a refractive index different from that of said optical member; and
   a semi-transmissive reflective film adapted to reflect light emitted directly from said laser source and to transmit light returned from said record medium,
   characterized in that light is prevented from directly reaching the optical sensor from the laser source by differentiating the refractive index of said optical member from the refractive index of said adhesive.

2. An optical pickup head according to claim 1 wherein the refractive index n1 of said optical member and the refractive index of n2 of said adhesive is set such that a critical angle $\alpha$ ($=\sin^{-1} n2/n1$) calculated by the refractive indices n1, n2 of the optical member and the adhesive is smaller than an incident angle of the light introduced into the optical member from the laser source forwarding the optical sensor.

3. An optical pickup head according to claim 2 wherein the refractive index of said optical member is set so as to be larger than the refractive index of said adhesive.

4. An optical pickup head according to claim 3 wherein said optical member is made of an optical glass material.

5. An optical pickup head according to claim 4 wherein said adhesive is a resin adhesive.

* * * * *